Nov. 23, 1948.  B. F. OWEN  2,454,475
SCRAPER
Filed Sept. 15, 1943  2 Sheets-Sheet 1

B. F. Owen  Inventor
By Arthur H. Sturges.
Attorney

Nov. 23, 1948.  B. F. OWEN  2,454,475

SCRAPER

Filed Sept. 15, 1943  2 Sheets-Sheet 2

Inventor
B.F. Owen
By Arthur H. Sturges.
Attorney

Patented Nov. 23, 1948

2,454,475

UNITED STATES PATENT OFFICE 2,454,475

SCRAPER

Benjamin F. Owen, Omaha, Nebr.

Application September 15, 1943, Serial No. 502,483

12 Claims. (Cl. 37—133)

This invention relates to earth moving machinery and more particularly to scrapers.

It is an object of the invention to provide a mechanism operable by one man while he is seated on a towing tractor for scraping up earth and the like, transporting and dumping or spreading the same.

Another object is to provide a device for the above stated purposes from which earth will not spill during a transportation thereof over rough roads and the like.

A further object of the invention is to provide a device which can be employed for pushing or "bulldozing" piles of earth deposited at the sides of a roadway under construction transversely of said roadway.

A still further object of the invention is to provide a device for the above stated purposes which will cut and scrape up earth to a selected depth and to provide means for distributing said earth in a thin layer or a thick layer as may be selected.

More particularly it is an object of the invention to provide a scraper of sturdy and economical construction having a swingable front wall and a swingable door portion of the rear wall thereof and a swingable bottom, and to provide means for swinging said rear portion to an extent corresponding with and responsive to a swinging of said bottom for spreading or dumping material as may be selected.

Other and further objects of the invention will be understood from the following description.

Figures 1, 2:
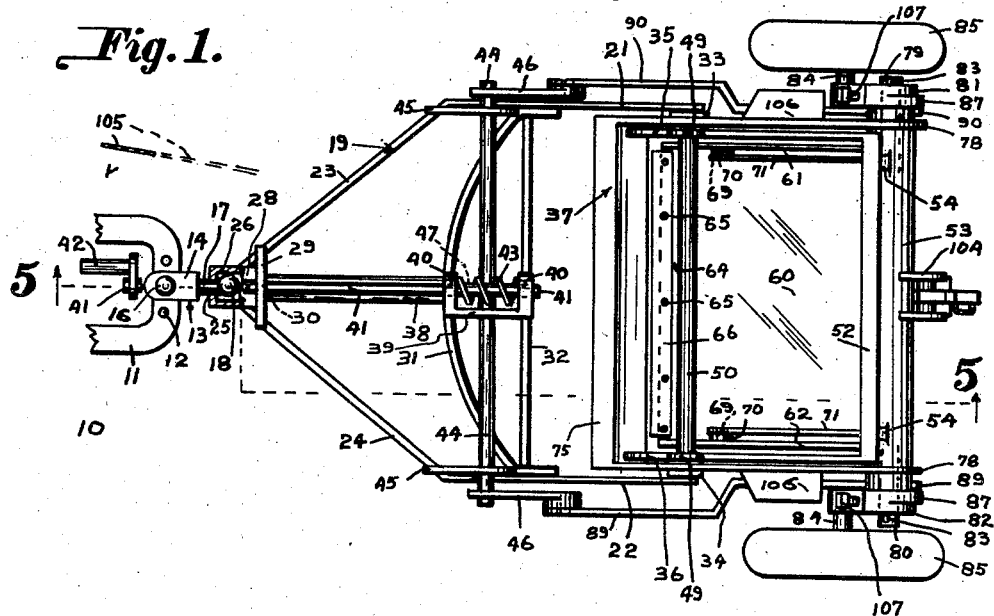
Figure 1 is a top plan view of the new device, certain portions thereof being broken away and others showing in section, the walls of the bucket of the scraper being in a closed position.
Figure 2 is a rear elevation of the device shown in Figure 1.

Referring to the drawings for a more particular description, 10 indicates generally a tractor, not shown. The tractor may be of "Farmall" type and of conventional construction, having a power take-off shaft at the rear end thereof. Said shaft is connected by means of gears, at times, to the crank shaft of the engine of the tractor, whereby the operator may manipulate a clutch for applying the power of the engine to said shaft, and the latter may be used, at times, in lieu of the manually actuatable hand crank 42 shown in the drawings for purposes later described.

The rear end of the tractor adjacent said power take-off shaft is provided with a towing step 11. The step 11 is provided with a plurality of apertures 12 through a selected one of which a coupling pin may be disposed for utilizing the tractor for towing purposes in a well known manner.

The new device includes a clevis 13, and preferably the clevis includes a plurality of tongues 14 between which the towing step may be selectively disposed in accordance with the height of the towing step above the surface of the ground 15 and in accordance with whether or not the tractor is of "Farmall" or other type.

A king pin 16 is disposed through the apertures of selected tongues of the clevis for pivotally coupling the latter to the towing step 11. A shaft 17 is secured to the clevis by welding or the like, and the rear end of said shaft is provided with a ball 18 which fits loosely into a later described socket.

As best shown in Figure 1, the towing tongue for the scraper of the present invention includes a strap iron bar, generally indicated at 19. The bar is bent to provide end portions 21 and 22 which are oppositely disposed in parallelism with respect to each other. From the forward ends of said bar portions the bar 19 is bent to provide portions 23 and 24 thereof which are disposed convergently toward the clevis. Adjacent the ball 18 the bar 19 is preferably bent rectangular in plan, as shown in section in Figure 1.

The forward end portion of the bar is provided with an aperture 25 through which the shaft 17 extends, and before said shaft is welded to the clevis said shaft is inserted through the aperture of the bar. The described construction provides a socket 26 within which the ball 18 is disposed, whereby the later described scraper may have pivotal turning movements with respect to the towing step 11.

Preferably a plate 27 is welded to the underneath edges of the portions of the bar adjacent the socket, and a similar plate 28 secured to the upper edges of said socket for reenforcing the latter. The plate 28 is provided with a standard portion 29, the upper end of which is provided with a transversely disposed aperture 30 through which a later described worm shaft 41 is journalled.

In order to maintain the end portions 21 and 22 of the bar 19 in parallelism during operation, an arcuate brace bar 31 is provided, the end portions of which are welded to the inner vertical surfaces of the portions 21 and 22 of the bar 19, and preferably a transversely disposed brace bar 32 is employed, especially at times when the scraper is constructed of large capacity for heavy duty. The ends of the brace bar 32 are welded or otherwise suitably secured to the ends of the arcuate bar 31.

The rear ends of the portions 21 and 22 are rigidly secured, by means of welding or the like, to like spacing blocks 33 and 34, and the inner surfaces of said blocks are respectively welded to the outer sides of the side walls 35 and 36 of the bucket, the latter being generally indicated at 37.

Figure 5:
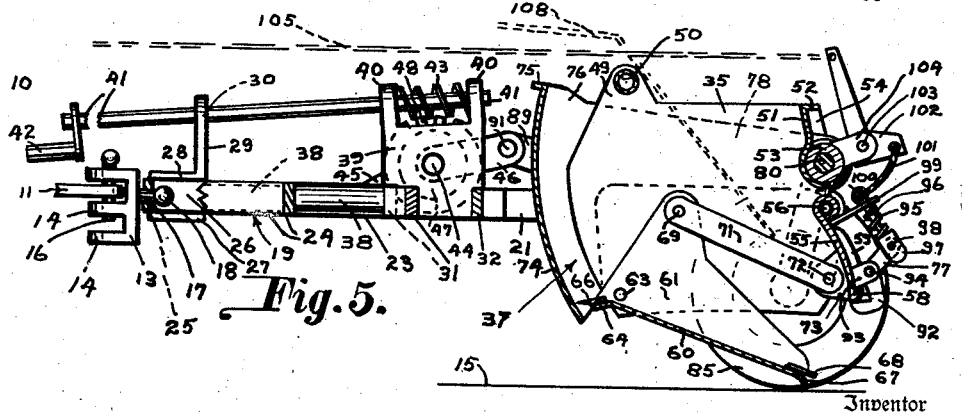
Figure 5 is a longitudinal vertical section, the view being taken substantially on line 5—5 of Figure 1.

As best shown in Figures 1 and 5, a tubular member 38 is provided having its rear end welded to the arcuate bar 31 and its forward end welded to the rear wall of the socket 26, whereby a rigid towing tongue for the bucket is provided.

As best shown in Figure 5, a vertically disposed plate 39 is provided with notches adjacent its lower end. The vertical walls of said notches abut snugly against the transverse brace bar 32 and the arcuate bar 31, being rigidly welded to said bars. The upper end of the plate 39 is provided with upstanding spaced apart ears 40 and, as shown in Figure 1, said ears also extend transversely from the plate, being apertured for receiving therethrough a worm shaft 41, said shaft also extending through the aperture 30 at the upper end of the standard 29.

At times when the scraper of the present invention is of small capacity, the forward end of the worm shaft 41 is provided with a hand crank 42; and at times when the bucket is constructed for heavy duty and of large capacity, the hand crank is omitted and the above outlined mechanism is employed for utilizing the power of the engine for imparting revoluble movements to the worm shaft 41 in either direction as may be selected by the operator. Between the ears 40 a worm screw thread 43 is provided on the shaft 41. The vertical plate 39 also provides a support for a transversely disposed crank arm shaft 44, the latter being journalled through said plate and through bearing plates 45, the latter, as best shown in Figure 1, having forward portions, the lower edges of which are welded to the strap iron bar 19, and rear portions which are welded to the arcuate bar 31.

The outer ends of the shaft 44 are each provided with a crank arm 46 rigidly secured thereto. A worm pinion 47 is welded or otherwise suitably secured to the shaft 44 adjacent the vertically disposed plate 39, and the teeth 48 of the pinion 47 are in constant mesh with the thread 43 of the worm screw, whereby at times when revoluble movements are imparted to the worm shaft 41, in either direction, corresponding movement is imparted to the crank arms 46 for purposes later described.

The oppositely disposed side walls 35 and 36 of the bucket are each provided with an upstanding tang portion 49, and a tubular brace 50 is provided having ends which extend through suitable apertures provided through said tangs, said ends being rigidly welded to the tangs, whereby the forward portion of said side walls are held in rigid parallelism with respect to each other and with respect to the tubular member 38 of the towing tongue. The side walls of the bucket are welded to its rear wall 51, the latter being provided with an upper reenforcing flange 52. The rear wall is approximately one-half the height of the side walls. A tubular axle 53 is welded to the rear wall 51, and preferably reenforcing ribs 54 extend from the flange 52 to the stationary axle 53, being welded to said rear wall, flange and axle, whereby the rear portions of the side wall are held rigid and in parallelism.

As best shown in Figures 2 and 5, below said rear wall a door 55 is provided. The upper portion of the door 55 is bent around pivot pins 56 and 57 which extend through suitable apertures provided through the side walls of the bucket, whereby the door is pivotally mounted for swinging movements in a vertical direction. The lower edge of the door is upturned, providing a reenforcing rib 58, and preferably portions of the side edges are bent to provide vertically disposed reenforcing ribs 59 whereby a strong door is formed.

The bottom 60 of the bucket is composed of a single rigid member and is formed integral with its vertically disposed wings 61 and 62 which, as best shown in Figure 1, are disposed in vertical parallelism with and close to their respective sides of the bucket. Each wing is provided with a pivot pin 63 adjacent its forward lower portion, and said pivots extend into the lower forward portions of the side walls, as best shown in Figure 5, whereby the bottom of the bucket is pivotally mounted for swinging movements in a vertical direction upon its pivot pins.

Forwardly of the pivot pins the bottom 60 is provided with a down turned portion 64 to which is secured, by means of suitable keepers or stud bolts 65, a transversely disposed cutter 66, said keepers being indicated in Figure 1 only. The rear edge of the bottom 60 is provided with a down turned lip portion 67, and midway between the ends of said lip a latch plate 68 is welded thereto.

Figure 4:
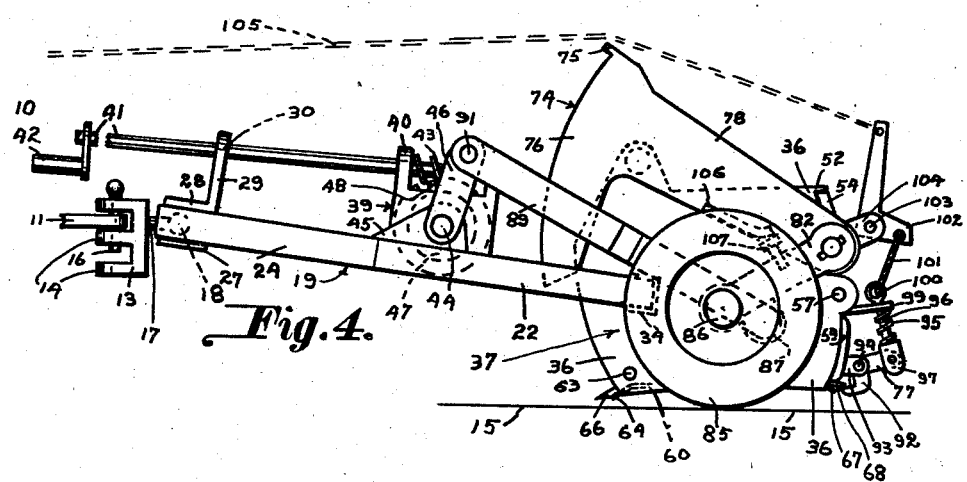
Figure 4 is a view similar to Figure 3 and showing the relative position of the parts at the time the front wall of the bucket is open and a scraper blade employed is close to a ground engaging position.

As best shown in Figure 5, adjacent the forward upper portion of the side wings of the bottom each wing is provided with a pivot pin 69, which are inwardly disposed. The pins 69 extend through the bushings 70 of the forward ends of links 71. The rear ends of the links 71 are pivotally attached as at 72 to inwardly disposed ears 73 of the door 55, said ears being welded to the inner surface of said door. At times when the rear end of the bottom swings downwardly to the position shown in Figure 5, the links 71 apply a corresponding motion to the pivotally mounted rear door 55, pushing the lower edge of the latter rearwardly and upwardly. At times when the rear edge of the bottom of the bucket is in an up position, as shown in Figure 4, said links cause the door to be swung forwardly correspondingly for closing the rear of the bucket. The bottom of the bucket and the door are latched together, at times, by a means later described.

Figure 3:
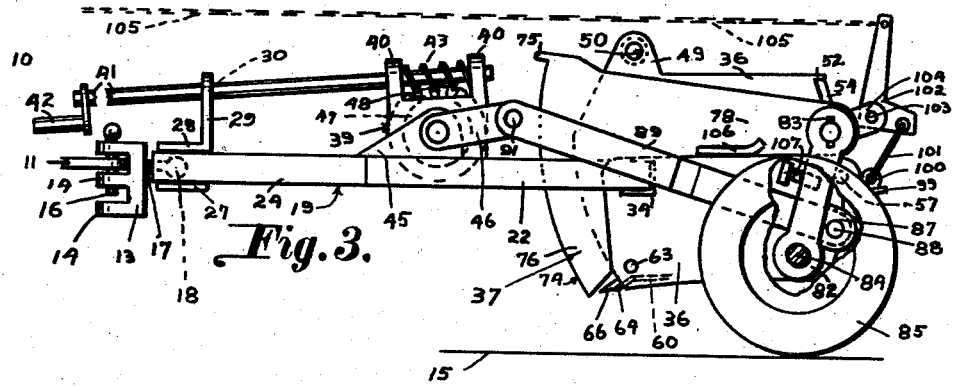
Figure 3 is a side elevation thereof.

The forward portion of the bucket is provided with a swingable wall or door 74 which is preferably of arcuate contour in vertical cross section, as shown in Figure 5. The upper edge of the front wall is bent to provide a transversely disposed reenforcing flange 75. As best shown in Figure 4, the front wall is provided with side flap portions 76. The forward edges of the flaps are welded to the vertically disposed edges of the front wall or front door. The flap portions each have an arm portion 78 which extends rearwardly, and the rear ends of said arm portions of the flaps are each provided with an aperture through which the stationary tubular axle 53 extends, whereby the front wall or front door is pivotally mounted on said axle for swinging movements in a vertical direction. The side flaps 76 extend rearwardly a distance sufficient to overlap the forward vertical edges of the side walls 35 and 36 of the bucket at times when the front wall is in an up position, as shown in Figure 4, and also at times when the front wall is in a down position, as shown in Figures 3 and 5.

As best shown in Figure 1, at times when the front wall or door is in a down position, the lower edges of the arm portions 78 of the flaps rest upon the spacing blocks 33 and 34 which then serve as detents for preventing a swinging movement of the front wall downwardly to an undesired extent, said spacing blocks also holding the ends portions 20 and 21 of the strap iron bar 19 spaced away from the side walls of the bucket a distance sufficient to permit the flaps 76 to swing in a vertical direction without binding on said side walls.

As best shown in Figures 1 and 2, the tubular axle 53 is provided at each end thereof with outwardly disposed pins 79 and 80 which provide a pivotal mounting for vertically swingable legs 81 and 82. The pins 79 and 80 respectively extend through the upper ends of the legs 81 and 82, and keeper detents 83 are disposed through the pins 79 and 80 for preventing the legs from becoming removed from their respective pins 79 and 80 during use.

The lower free ends of the legs are each provided with an outwardly disposed stub axle 84, each of which supports a wheel 85. The wheels may be of solid construction, of semi-resilient construction, and preferably are of pneumatic type as shown in the drawings. The stub axles 84 extend into the hubs 86 of the wheels, and preferably ball bearings are provided between said stub axles and hubs.

Adjacent the lower free ends of the legs 81 and 82, each is provided with an integral rearwardly disposed spur portion 87. Each spur is provided with a pivot pin 88. The pins 88 respectively extend through the rear ends of reach rods or links 89 and 90, and the forward ends of said links are pivotally connected as at 91 to the outer free ends of their respective crank arm 46, whereby at times when said crank arms are moved by the worm mechanism a corresponding movement is imparted to the wheel supporting legs of the new device for swinging said wheels in a vertical direction correspondingly and for raising or lowering said wheels with respect to the bucket.

The mechanism for latching the rear edge of the bottom of the bucket to the bottom edge of the rear door of the bucket includes the above described plate 68 and a hook 92. A pair of ears 93 is welded to the rear outer side of the door and the hook is pivotally attached, as at 94, between said ears. The hook 92 is provided with a forward portion 95, the lower edge of which is of arcuate contour in side elevation, as best shown in Figure 5, whereby at times when the bottom of the bucket is swung upwardly the latch plate 68 engages said arcuate portion and forces the latter rearwardly as said latch plate moves upwardly until such time as the hook engages under the latch plate 68, as shown in Figure 4, said down turned lip of the bottom permitting said latching, said engagement being forced by means of a spring 95 disposed about a latch shaft 96, the latter having a clevis 97 pivotally connected as at 98 to the outer end of the off-set arm 77 of the hook 92. The spring 95 is disposed between said clevis 97 and a rearwardly disposed plate 99, the latter having an end rigidly welded to the door of the bucket, and since said spring is of expansion type the hook 92 is urged towards the rear door 55 at all times thereby.

The latch shaft 96 extends through a suitable aperture provided through the plate 99, said shaft having an eye 100 which, as best shown in Figure 5, is attached to a flexible cord or cable 101, and a chain may be employed in lieu of said cable if desired. The other end of the cable is attached to the outer end of a bell crank lever 102. The bell crank 102 is pivotally mounted as at 103 between a pair of ears 104. The forward ends of the ears 104 are rigidly welded to the stationary axle 53, whereby pivotal swinging movements in a vertical direction of the bell crank lever 102 are permitted.

The upper end of the bell crank lever 102 is attached to a rope 105, a portion of which is shown in full lines in Figure 1 and other portions thereof being represented by dotted lines in the several views.

At times when the rear door is locked to the rear edge of the bottom by means of the hook 92, as shown in Figure 4, and the operator while seated upon the towing tractor pulls the rope 105 towards him, a corresponding movement is imparted to the bell crank lever 102. At this time the flexible cable 101 is taut, as shown in Figures 3 and 4; the then taut cable causes the hook 92 to become disengaged from the latch plate 68 and against the urge of the spring 95, whereupon the weight of the rear end of the bottom of the bucket causes said rear end to drop downwardly, thereby causing the lower edge of the rear door of the bucket to swing rearwardly.

As best shown in Figures 3 and 4, lugs 106 are welded or otherwise suitably secured to the outer vertically disposed surfaces of each arm portion 78 of the side flap portions of the front wall of the bucket. Preferably the rear end portions of the lugs 106 are slightly upturned, as best shown in Figure 3.

As best shown in Figures 1 and 3, each of the legs 81 and 82 is provided with an adjustable set screw 107. The heads of the set screws are arranged to engage the lugs 106 during forward and upward swinging movements of the legs for raising the arms of the front wall of the bucket from their normal position of contact with the spacing blocks 33 and 34, as shown by dotted lines in Figure 3, to an upward position, as shown in Figure 4, whereby the front door or wall of the bucket is open.

As shown in Figures 1, 2 and 3, the several parts of the scraper are in a normal position for being towed rapidly by the tractor 10 in either a loaded or unloaded condition. In operation, for grading and transporting earth, as the scraper approaches the location where earth is to be removed the operator actuates the worm screw mechanism for causing the bucket to be lowered towards the surface of the ground 15 and from the position shown in Figure 3 to the position thereof shown in Figure 4. A further lowering of the bucket causes the forward sharp edge of the cutter 66 to engage the earth during forward travel of the scraper. The front wall of the latter at this time being in a raised position, the bucket fills with earth, whereupon the worm screw is then caused to be actuated for raising the bucket to the position shown in Figure 3. The loaded scraper is then transported or towed by the tractor to the location where earth is being either filled in or dumped.

Upon arriving at the unloading location, and assuming that earth is to be spread in a thin lamination, the bottom of the bucket is lowered, by actuating the worm screw mechanism, to a position close to the surface of the ground, whereupon the rope 105 is actuated for releasing the hook. Since the bottom of the bucket is close to the ground, the rear edge of said bucket swings downwardly but a short distance and the rear door moves rearwardly a correspondingly short distance, so that a comparatively thin lamination of soil is deposited or spread during forward travel of the tractor and bucket.

A thin spreading of earth is of advantage at times when the new device is employed for road building purposes and during a construction of athletic fields, since a heavy sheep's foot roller may follow the scraper for compacting deposited laminations of earth advantageously.

At times when it is desired to dump the scraper's load, the bucket is permitted to remain in an elevated position, as shown in Figure 3, whereupon the rope 105 is actuated for dumping said load as a unit and as distinguished from a spreading of material, and this is of advantage at times when filling an embankment adjacent the side of a road. After the load is dumped the rear wall and bottom are hooked together and, if desired, the bucket lowered to the position shown in Figure 4, whereupon by causing the tractor to move rearwardly against the pile of earth deposited from the scraper, the rear wall and rear door of the scraper "bulldozes" or pushes said pile and forces it over the side of the embankment for adding earth to the latter.

During road building a man is usually employed adjacent said embankment for directing operators of scrapers where to dump or spread their loads, and he can manually move the rear end of the bottom of the bucket into latched engagement with the hook 92. If desired, a flexible cable, shown by dotted lines in Figure 5 only, may be attached to the rear end of either one of the links 71, said cable extending over the brace 50 to the operator of the tractor, who by hauling on said cable or rope may cause said bottom to become latched to the rear door and against the urge of the latch spring.

During forward travelling movements and at times when the bottom of the scraper is close to the ground, the down turned lip portion 67 of the bottom guards the hook 92 for preventing said hook from contacting with the ground, whereby an unlatching of the rear door with respect to the bottom is prevented at undesired times.

From the foregoing description it is thought to be obvious that a scraper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out by invention in practice, except as claimed.

I claim:

1. An earth moving device comprising a tongue having an end arranged to be pivotally attached to the rear of a towing tractor; a bucket having side walls and a rear wall, said walls being rigidly attached together and to the other end of said tongue; said rear wall being provided with a door hingedly connected thereto; said bucket being provided with a front wall and a bottom each being pivotally attached thereto for vertical swinging movements; links having ends pivotally connected to said door and bottom for causing relative movements thereof; means for latching said door and bottom together; a cutter secured to the front edge of said bottom; vertically swingable legs having ends pivotally attached to the sides of the bucket; revoluble wheels attached to the other ends of said legs for supporting the bucket above said earth during transportation of the bucket; means for raising said wheels and front wall above said cutter for permitting the latter to engage said earth for loading said bucket during a forward movement of the bucket; and means for releasing said latch for permitting said load to move outwardly of the bucket.

2. An earth moving device comprising a tongue arranged to be pivotally attached to a towing tractor, a bucket having side walls and a rear wall directly attached to said tongue, said rear wall being provided with a door hingedly connected thereto, said bucket having a pivotally mounted front wall and a bottom pivotally attached to said side walls, means for latching said door and bottom together, arms pivotally attached to the sides of the bucket, wheels revolvably mounted on said arms for normally supporting the bucket above said earth, means for raising said wheels above said bottom, and means for raising said front wall away from said bottom responsive to an actuation of said wheel raising means.

3. In an earth moving device, a bucket having side walls and a rear wall rigidly attached together, said rear wall being provided with a door hingedly connected thereto, a front wall and a bottom for said bucket each being pivotally attached thereto, links having ends pivotally connected to said door and bottom respectively for causing relative swinging movements thereof, a latch for securing said door and bottom together for preventing said swinging movement, and means for releasing said latch.

4. In an earth moving device, a bucket having side walls and a rear wall rigidly connected together, said rear wall being provided with a door hingedly connected thereto, said bucket having a bottom pivotally connected to said side walls, a latch for securing said door and bottom together for preventing pivotal movements thereof, said bucket being provided with a front wall having arms disposed outwardly of said side walls, and a pivotal connection between said bucket and arms adjacent said rear wall, said arms being provided with flap portions arranged to overlap the forward portions of said side walls.

5. In an earth moving device, a bucket having spaced apart side walls and a rear wall rigidly connected together, said rear wall being provided with a door having an upper portion hingedly connected thereto, said bucket having a bottom pivotally connected adjacent its forward end to and between said side walls, revoluble wheels for supporting the bucket above said earth, means for raising said wheels above said bottom for permitting the forward end of the latter to engage said earth, a latch for securing the rear end of said bottom and the lower end of said door together, and means for releasing said latch for permitting material to move outwardly of said bucket.

6. A device as defined in claim 5 which further includes links having ends respectively pivotally connected to said door and bottom for causing relative pivotal movements thereof.

7. In an earth moving device, a bucket having vertically disposed spaced apart side walls and a rear wall rigidly connected thereto, said rear wall being provided with a door hingedly supported by said rear wall, a bar disposed between and secured to said side walls adjacent the forward upper portions thereof for maintaining said portions substantially parallel, said bucket being provided with a front wall having rearwardly disposed arms outwardly of said side walls, the rear ends of said arms being pivotally attached to said bucket for permitting vertical swinging movements of said front wall with respect to said side walls, said bucket having a bottom pivotally connected adjacent its forward end to said side walls, and a latch for securing said door and bottom together at desired times.

8. An earth moving device comprising a bucket substantially rectangular in plan; a tongue attached to said bucket for towing the latter; wheels for supporting said bucket above a roadway during a conveying movement thereof; said bucket having front and rear walls, side walls and a bottom; a door hingedly connected to said rear wall for swingable movements; said bottom having a pivotal connection between its front and rear ends with said side walls; means for latching said bottom and door together for preventing pivotal turning movements thereof; means for raising said wheels and front wall above said bottom for permitting the forward end of the latter to engage said earth for scraping a load of material into the bucket during a forward movement of the latter and for lowering said wheels below said bottom after a material loading operation; and means for releasing said latch to permit the rear end portion of said bottom to swing downwardly and the lower portion of said door to swing rearwardly for permitting material to move out of said bucket.

9. A device as defined in claim 8 which further includes a link having ends pivotally connected respectively to the door and bottom for causing relative pivotal movements thereof.

10. An earth moving device comprising a bucket having spaced apart side walls, a front wall, a rear wall and a bottom pivotally attached to said side walls; a tongue attached to said bucket for towing the latter; wheels for supporting said bucket above a roadway during a conveying movement thereof; means for swinging said wheels above said bottom for permitting the forward end of the latter to engage said earth, said means being arranged to actuate said front wall for swinging the latter above said bottom during a material loading operation; means for opening a portion of said rear wall for permitting said material to move outwardly of the bucket for unloading the latter; and means for latching said swingable portion of the rear wall to said bottom at desired times.

11. An earth moving device comprising a tongue arranged to be pivotally attached to a towing tractor, a bucket having side walls and a rear wall directly attached to said tongue, said rear wall being provided with a door hingedly connected thereto, said bucket having a pivotally mounted front wall and a bottom pivotally attached to said side walls, means for latching said door and bottom together, a cutter secured to the front edge of said bottom, wheel arms pivotally attached to the sides of the bucket, wheels revolvably mounted on said wheel arms for normally supporting the bucket above said earth during transportation of the bucket, means for raising said wheels and front wall upwardly with respect to said bottom and means for raising said front wall away from said bottom responsive to an actuation of said wheel raising means.

12. A device as defined in claim 11 which further includes means for releasing said latch.

BENJAMIN F. OWEN.

REFERENCES CITED

The following references are of record in the file of this patent:

UNITED STATES PATENTS

| Number | Name | Date |
|---|---|---|
| 468,393 | Johnson | Feb. 9, 1892 |
| 999,857 | Patterson | Aug. 8, 1911 |
| 1,622,085 | Briggs | Mar. 22, 1927 |
| 1,817,985 | Jamison | Aug. 11, 1931 |
| 1,860,805 | Cook | May 31, 1932 |
| 2,060,369 | Gove | Nov. 10, 1936 |
| 2,215,026 | Austin | Sept. 17, 1940 |
| 2,229,241 | French | Jan. 21, 1941 |
| 2,255,062 | Johnson | Sept. 9, 1941 |